July 29, 1941. V. MEKLER ET AL Re. 21,869

METHOD AND APPARATUS FOR FORMING COKE

Original Filed May 17, 1939

INVENTORS
August Henry Schutte
BY and Valentine Mekler
Nathaniel Ely
ATTORNEY

Reissued July 29, 1941 Re. 21,869

UNITED STATES PATENT OFFICE 21,869

METHOD AND APPARATUS FOR FORMING COKE

Valentine Mekler, Jackson Heights, and August Henry Schutte, Tuckahoe, N. Y., assignors to The Lummus Company, New York, N. Y., a corporation of Delaware Original No. 2,226,501, dated December 24, 1940, Serial No. 274,092, May 17, 1939. Application for reissue March 14, 1941, Serial No. 383,446

9 Claims. (Cl. 202—36)

This invention relates to improvements in the method of, and apparatus for, forming coke.

In the formation of coke by the conversion of hydrocarbons, it is the common practice to pass suitable hydrocarbon vapors and liquid into a chamber under sufficient temperature and pressure and for the desired time to form an accumulation of coke which is ultimately removed after which the coking operation is again resumed. The removal of such coke has been very difficult because of its hardness and because of its adhesion to the coking vessel. The expense of removing coke has therefore been very great.

The principal object of the invention is to provide an improved method of forming coke and removing coke from a coking vessel, whereby the coke may be removed as a substantially integrated mass and with the very minimum of delay in the resumption of coking operations. More particularly, this is accomplished by the use of a removable liner in which the coke is formed; such liner being particularly characterized by its cheapness which makes it possible to discard the liner after the liner has been removed from the coke.

The invention is differentiated from the prior known constructions in that the liner is merely a temporary support for the coke and can be removed therefrom without substantial destruction of the coke body thereby materially reducing the quantity of fines which are formed.

Another object of the invention is to provide an improved form of coking drum having a removable liner which forms a temporary support for the coke and forms a channel for the continuous removal of the cracked vapors at the bottom of the chamber.

Another object of the invention is to provide an improved method for producing a metallurgical coke which is low in volatile matter and which may be easily formed and removed from the coking chamber.

Further objects and advantages of the invention will appear from the following disclosure of a preferred form of embodiment thereof taken in connection with the attached drawing illustrative thereof, in which.

Figure 1:
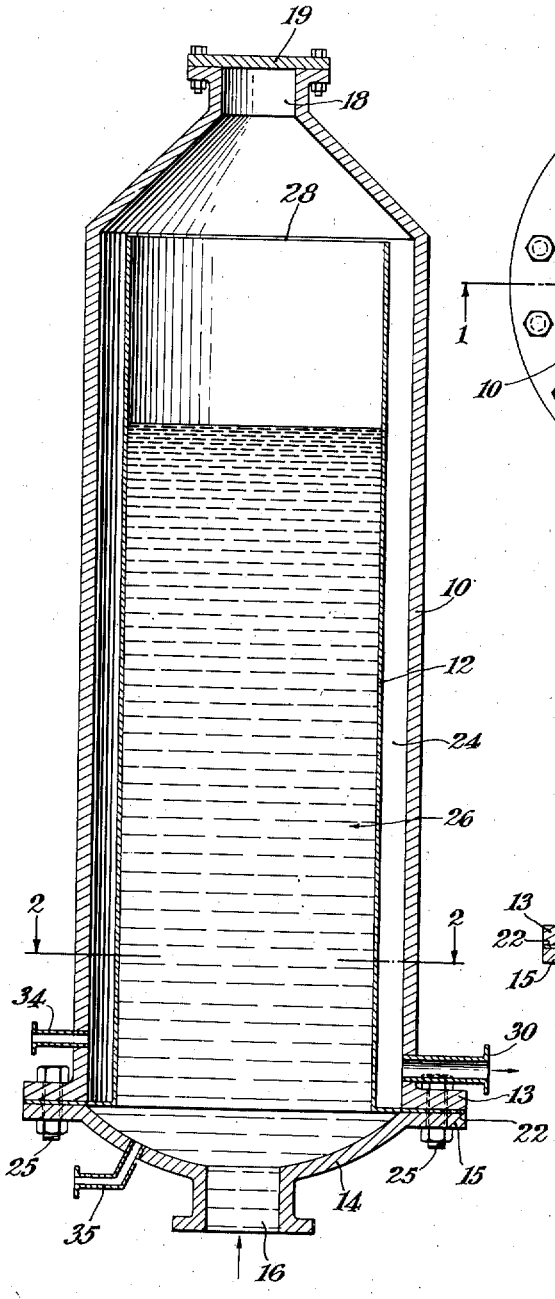
Figure 1 is a vertical cross section through a preferred type of coking chamber and taken substantially along the line 1—1 of Figure 2.
Figure 2:
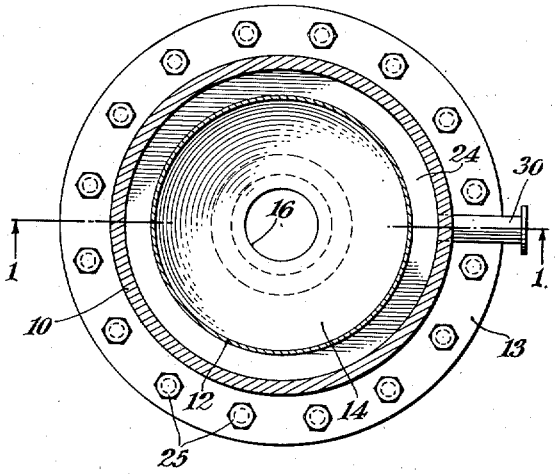
Figure 2 is a horizontal cross section taken substantially along the line 2—2 of Figure 1.

In accordance with a preferred form of embodiment of the invention, the coking apparatus includes a pressure vessel generally indicated at 10, which is provided with a liner 12 of substantially the same cross sectional shape and somewhat smaller cross sectional area so that its walls are spaced from the walls of the vessel 10. The liner 12 is conveniently provided with flanges 22 projecting outwardly and by which it may be supported between the flanges 13 of the pressure vessel 10 and the flanges 15 on the bottom cover 14 with the entire construction bolted together as by the bolts 25.

The pressure vessel is conveniently provided with a manhole 18 at the top which may be provided with a removal cover 19 so that the interior of the vessel may be inspected for corrosion and for other purposes.

The bottom of the vessel is provided with a smaller manhole 16 which in this case may conveniently serve as an inlet for the introduction under suitable temperature and pressure conditions of hydrocarbon material to be coked. This material passes into the interior of the liner 12 to form coke by reaction therein with the mass of hydrocarbons 26 already undergoing decomposition. The vapors from the coking reaction discharge over the top 28 of the liner 12 and pass downwardly through the annular space 24 and thence out through the outlet 30.

The liner 12 is preferably of a relatively thin metal which is only sufficiently strong to retain the coke during formation. Hydrostatic pressure being the same at each side of the walls of the liner, the liner need not withstand any substantial pressure and inasmuch as it is spaced a substantial distance from the inner walls of the vessel 10, it may buckle or expand to a limited extent without contacting with the internal walls of the vessel and without rupture. The annular space 24 is conveniently a means to admit the free removal of the liner 12 and to assure a rapid flow of vapors to and through the outlet to prevent any substantial formation of coke on the external walls of the liner.

Under normal operating conditions, the chamber 10 will fill to approximately 8 feet from the top of the liner before any entrainment of heavy oil is noticed in the outlet vapors. At this time the coking operation may be stopped and as soon as the apparatus has cooled, the liner may be removed from the vessel and the liner then removed from the coke.

With a relatively thin and inexpensive quality of metal for the liner, it may be removed by any means and the liner thrown away, or it may be possible to provide a liner which is provided with a longitudinal joint which may be opened so that the liner may be suitably peeled from the coke and then restored if otherwise undamaged. In this manner the coke is left in a substantially integrated mass and need not be broken up except into the desired sized pieces and the quantity of fines is materially reduced.

It will be apparent that it is advantageous to remove the coke quickly from the coking chamber and it will be apparent that there is a substantial further advantage in not having to break up the coke to remove it from the chamber. The liner may be cleaned at a convenient time and place and if desired might be used as a transporting medium for the coke with the liner ultimately removed where the coke was to be eventually used.

If desired, vacuum lines 34 and 35 may be provided on the chamber so that a vacuum may be applied at opposite ends of the liner 12.

We have found that if a substantial vacuum is applied to the unit before it completely cools after the inlet is shut off, it is possible to remove substantially all of the volatile matter normally contained in the coke.

In many cases the volatile matter may be as high as 15% under normal circumstances which renders the coke unfit for many commercial metallurgical and domestic purposes and decreases its value as a fuel.

It is, therefore, proposed that the lines 34 and 35 be suitably connected to vacuum sources so that after the coking operation is completed, a substantial vacuum will be applied which will remove the greater part of this volatile matter. It may be found desirable to circulate an inert material such as steam through the coke bed and this, of course, can be accomplished by introducing steam into one of the connections 34 or 35 and applying a vacuum to the other. The circulation, of course, may be reversed to effect the removal of the volatile matter.

The density of the coke materially increases with reduction of the volatile matter, so that it becomes almost impossible to effectively remove such coke from the ordinary coking chamber. It is found, however, that these difficulties are obviated by present construction inasmuch as the liner is removed from the coke irrespective of its internal condition. The manufacture of metallurgical coke having low volatile matter is particularly effective in this type of chamber and the liner which may be a frangible material or a relatively thin, flexible metal member is readily removed from the extremely hard coke, and if the liner is destroyed it is substantially less costly than the former methods used for removing the coke.

Figure 3:
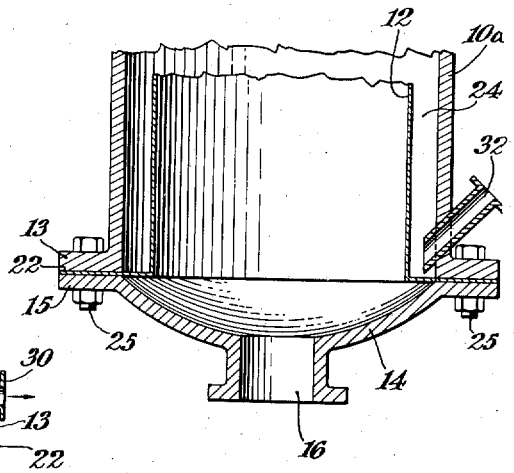
Figure 3 is a partial vertical section showing an alternative form of vapor outlet.

A slightly modified form of construction is shown in Figure 3 in which the liner 12 is similarly used in a vessel generally indicated at 10*a*; such vessel having a vapor outlet which is inclined as shown at 32. Such construction allows removal of any liquid products which might collect at the bottom of the annular space to prevent formation of coke on the top of the flange.

While we have described a preferred form of embodiment of our invention, we are aware that modifications may be made thereto and we therefore desire a broad interpretation of the invention within the scope and spirit of the description herein and of the claims appended hereinafter.

We claim:

1. A coking apparatus of the class described comprising a pressure vessel, one end of which has an opening of the maximum cross sectional area of the vessel, a cover for said opening, a liner of smaller cross sectional area than that of said vessel provided with projecting flange means for sealing with respect to said vessel and the cover therefor, a hydrocarbon inlet in said cover in communication with the interior of said liner, and a hydrocarbon outlet in said vessel in communication with the opposite end of said liner, said liner being spaced from said vessel, said liner being removable from said vessel, and being of relatively thin metal.

2. The method of forming coke with a relatively small production of fines which comprises the steps of introducing hydrocarbon material to be coked into a coking chamber provided with a frangible metal liner spaced from the wall of said chamber, causing the hydrocarbon material to coke only within the frangible liner and removing the vapors formed by the coking reaction from the chamber, withdrawing from the coking chamber at the end of the coking period the frangible metal liner containing the coke mass, and then removing the liner from the coke mass.

3. The method of forming coke of low volatile matter content suitable for metallurgical uses and the like which comprises the steps of introducing hydrocarbon material to be coked under suitable temperature and pressure conditions into a frangible metal compartment contained within but spaced from the wall of a coking chamber, causing the hydrocarbon material to coke only within the frangible compartment and removing the vapors formed by the coking reaction from the chamber, subjecting the contents of said frangible compartment at the end of the coking period to a vacuum to remove substantially all of the volatile matter from the coke, and thereafter withdrawing from the coking chamber the frangible compartment containing the coke mass and removing the compartment from the coke mass.

4. In an apparatus for coking hydrocarbon materials and separating vaporous products from the coke formed therein, a chamber comprising an outer housing, an open-ended, internal, removable liner positioned in said housing and sealed at one end to the wall thereof, means in one end of said housing in communication with said liner for continuously depositing hydrocarbon materials to be coked within a zone defined by said liner, said liner being such that the mass of coke collected therein will be removed intact therewith when the liner is removed from said housing, said liner being relatively thin so that it may be stripped from the coke, and means in said housing in communication with the opposite end of said liner for removing therefrom hydrocarbon vapors formed by the coking reaction.

5. A coking apparatus comprising an outer chamber, an open-ended frangible liner in said chamber spaced from the wall thereof and sealed at one end to the chamber wall, means at said end of the chamber to continuously introduce into the zone defined by said liner hydrocarbon material to be coked, said liner being removable from said chamber, and means in communication with the opposite end of said liner to remove the vapors formed by the coking reaction, said hydrocarbon introduction means and said vapor removal means being adjacent each other but separated by said liner, said vapor removal means being attached at an angle to said chamber near the point of sealing of the liner thereto and extending substantially into the space between the liner and the chamber to insure removal of any liquid material carried into said space.

6. The method of forming coke which comprises the steps of introducing hydrocarbon material to be coked into one end of a coking chamber provided with a frangible liner spaced from the wall of said chamber and sealed at said end to the chamber wall, causing the hydrocarbon material to coke only within the liner, removing from the chamber the vapors formed by the coking reaction by causing them to pass out through the other end of the liner and through the space between the liner and the chamber wall, withdrawing from the coking chamber at the end of the coking period the liner containing the coke mass, and then removing the liner from the coke mass.

7. The method as claimed in claim 3, which includes the step of introducing an inert gas into the chamber simultaneously with the application of a vacuum thereto to aid in the vaporization of the volatile matter from the coke.

8. The method of forming coke which comprises the steps of introducing hydrocarbon material to be coked into one end of a coking chamber provided with a relatively thin liner spaced from the wall of said chamber and sealed at said end to the chamber wall, causing the hydrocarbon material to coke only within the liner, removing from the chamber the vapors formed by the coking reaction by causing them to pass out through the other end of the liner and through the space between the liner and the chamber wall, withdrawing from the coking chamber at the end of the coking period the liner containing the coke mass, and then removing the liner from the coke mass.

9. In an apparatus for coking hydrocarbon materials and separating vaporous products from the coke formed therein, a chamber comprising an outer housing, an open-ended, internal, removable liner positioned in said housing spaced from the wall thereof and sealed at one end to the wall thereof, means in one end of said housing in communication with said liner for continuously depositing hydrocarbon materials to be coked within a zone defined by said liner, said liner being such that the mass of coke collected therein will be removed intact therewith when the liner is removed from said housing, said liner being of thin, flexible metal so that it may be stripped from the coke, and means in said housing in communication with the opposite end of said liner for removing therefrom hydrocarbon vapors formed by the coking reaction.

VALENTINE MEKLER.
AUGUST HENRY SCHUTTE.